FIG_VI_
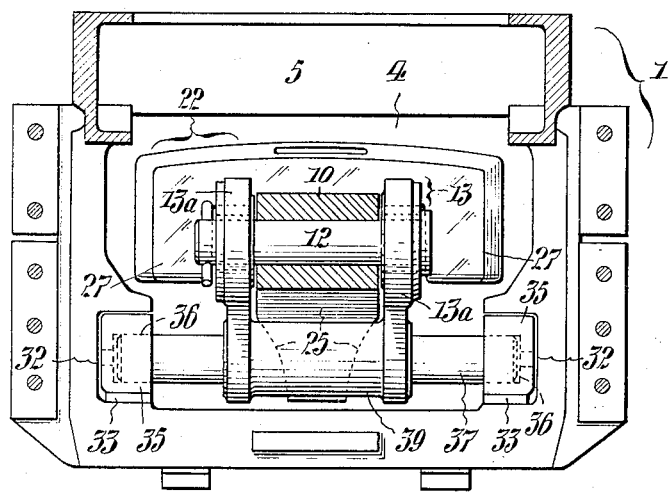
FIG_VII_
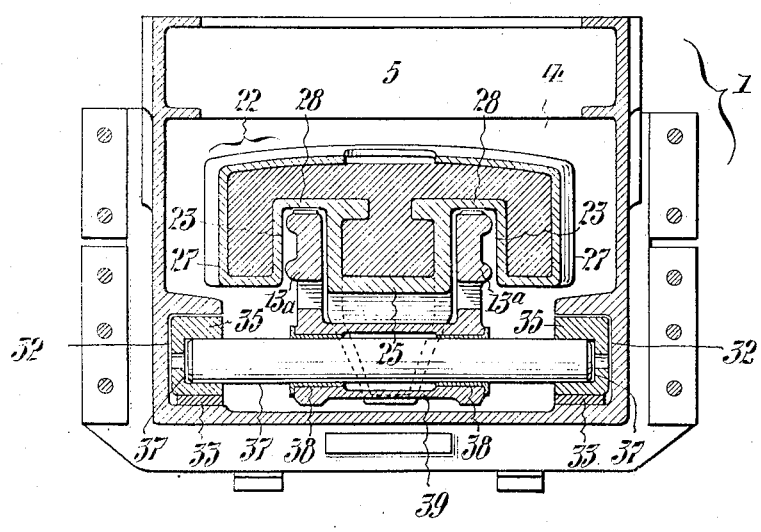

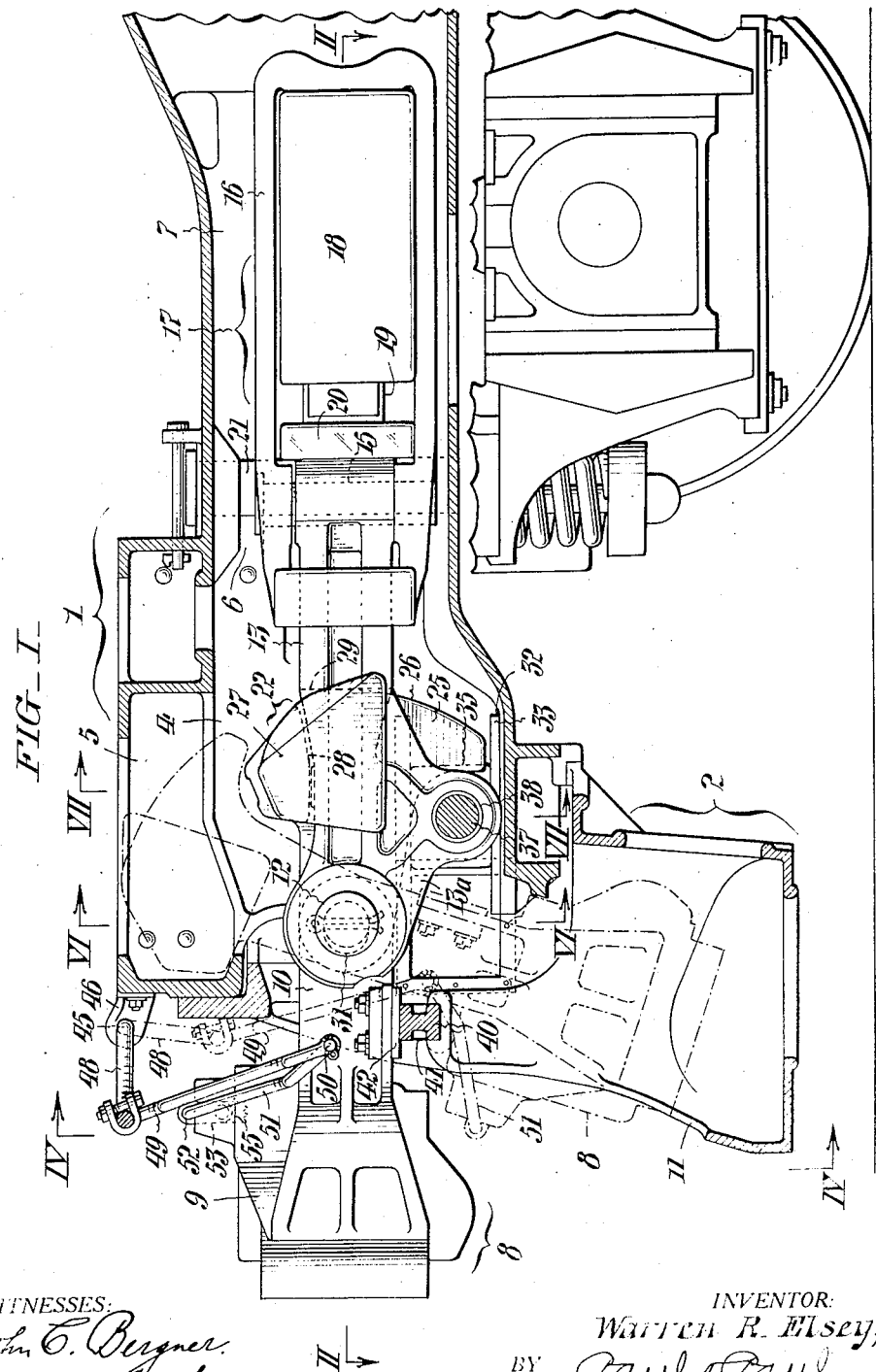

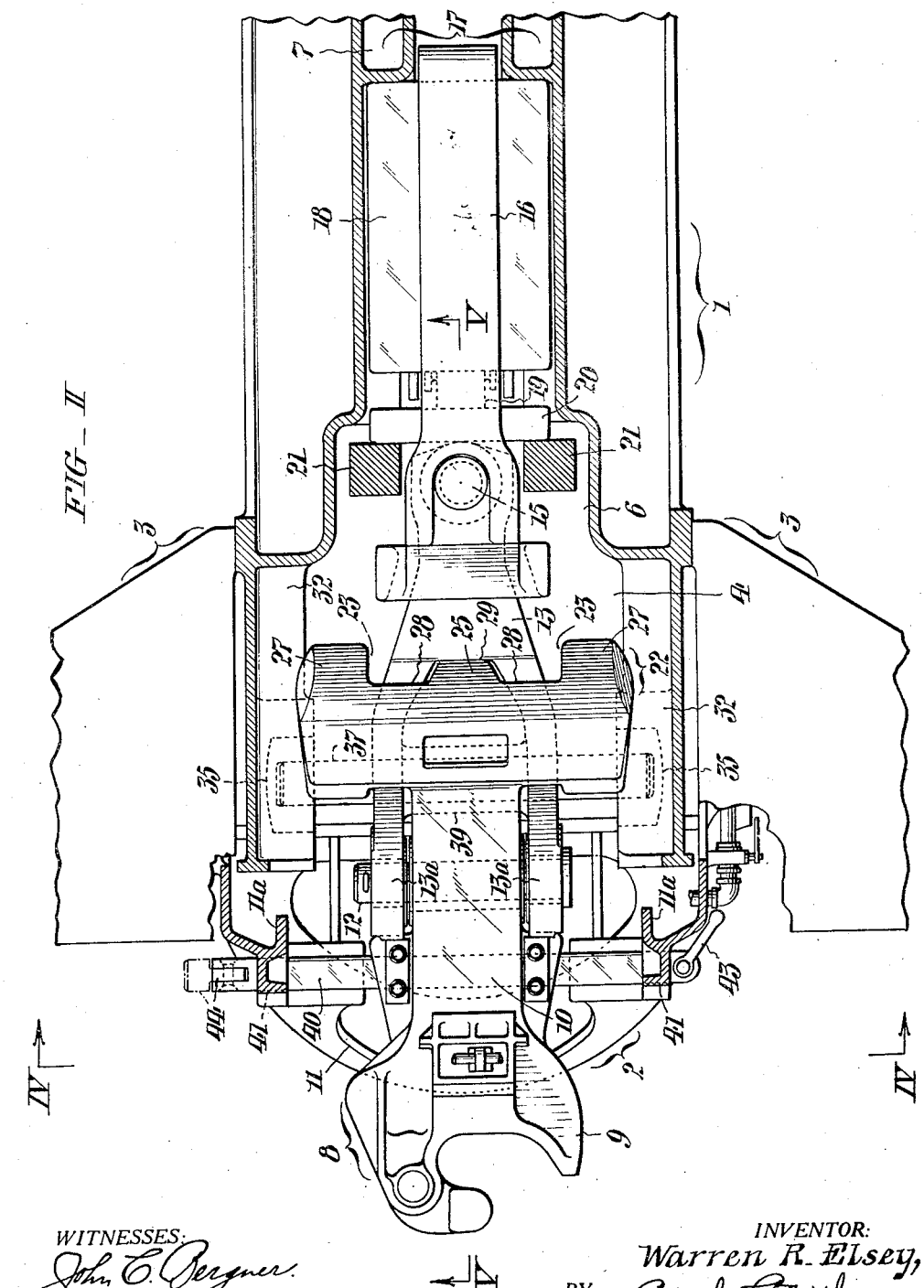

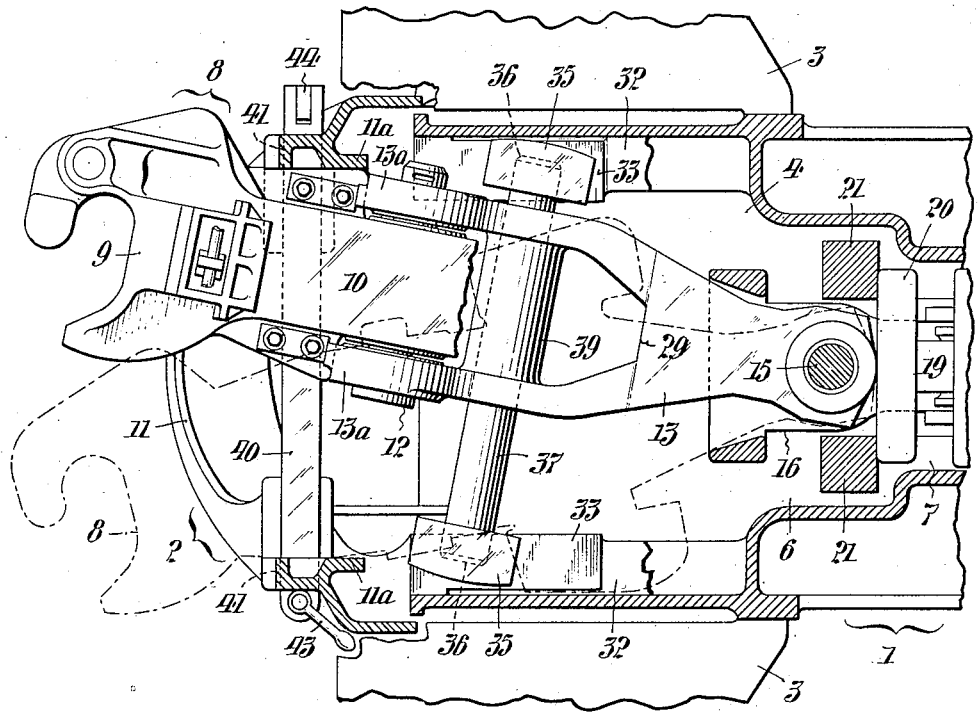
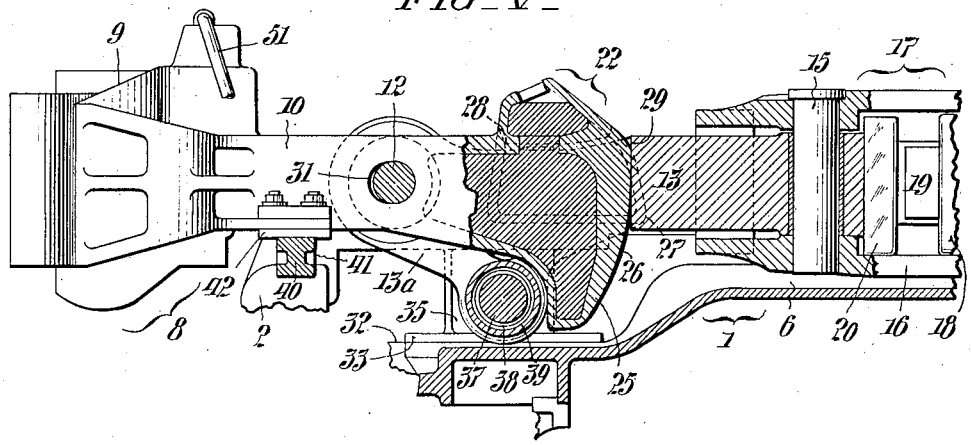

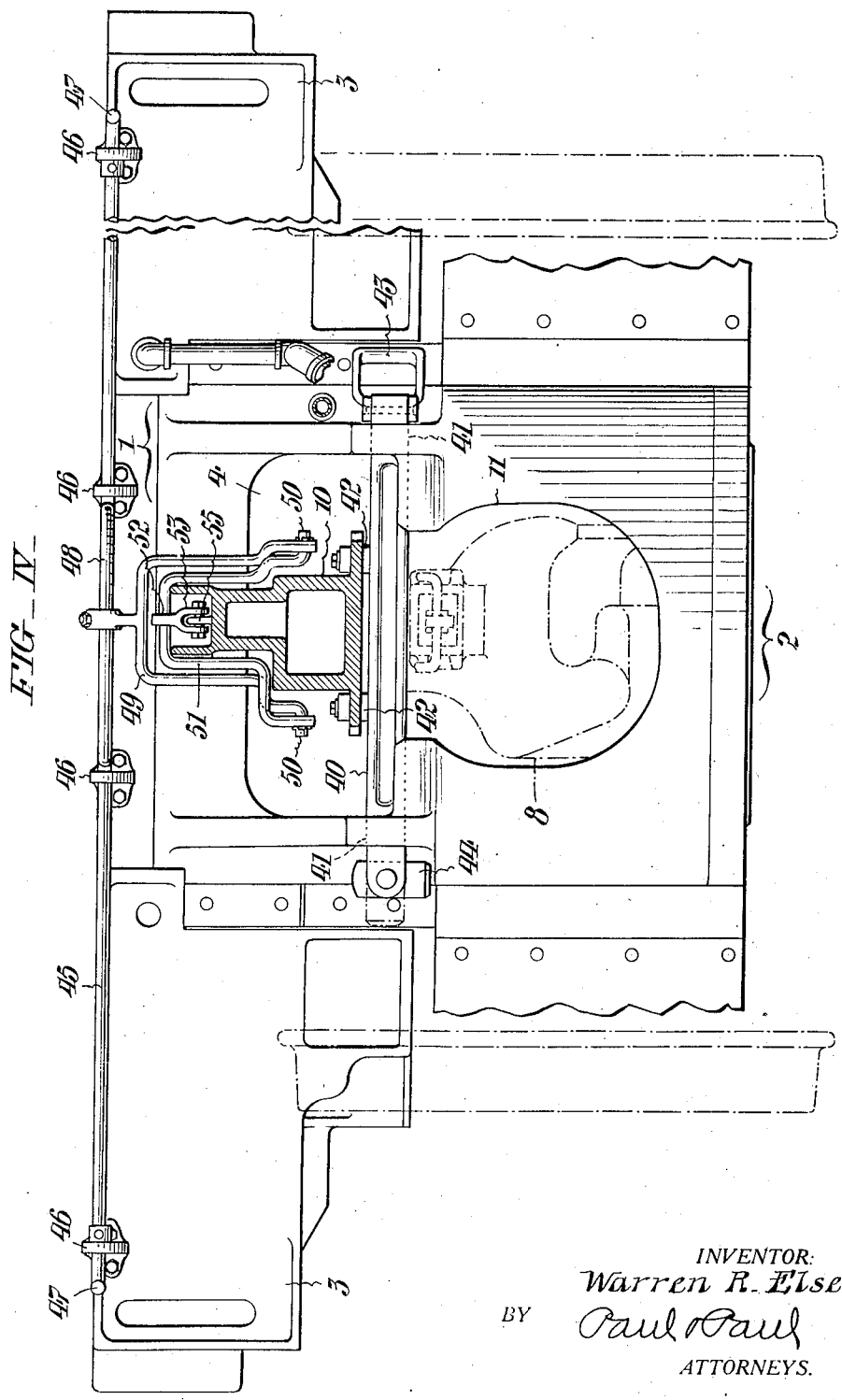

Patented July 4, 1939

2,164,703

UNITED STATES PATENT OFFICE 2,164,703

COUPLING MEANS FOR LOCOMOTIVES AND THE LIKE

Warren R. Elsey, Merion, Pa., assignor to The Pennsylvania Railroad Company, Philadelphia, Pa., a corporation of Pennsylvania Application September 8, 1937, Serial No. 162,870

8 Claims. (Cl. 213—4)

This invention relates to coupling means useful in connection with steam or electric locomotives, motor-driven railway cars, etc.

The couplers ordinarily used on locomotives and motor-driven cars extend forwardly beyond the pilots and thus constitute projections, which, in the event of collision with automobiles or other vehicles tend to hold the wreckage instead of allowing it to be deflected sidewise by the pilots. The wreckage thus impaled upon the couplers is dragged along for a considerable distance before the train can be brought to a standstill and invariably drops onto the track rails where it is likely to cause derailment of the locomotive or its train.

My invention is directed in the main toward precluding such contingencies, and this objective I realize in practice as hereinafter more fully disclosed, through provision of a coupler which is pivotally supported so as to be movable about a horizontal axis into the pilot of the locomotive, and which is counterweighted so that it tends to automatically seek its normal or active position.

Another object of my invention is to make it possible to employ a draft gear in association with the coupler having the aforementioned attributes, for absorbing the shocks received by the coupler incident to connection of the locomotive with another locomotive or with a railway car.

Another object of my invention is to provide a simple manually-operable knuckle release means with linkage capable of swinging into the hollow of the locomotive pilot with the coupler when the latter is moved to its inactive position.

Other objects and attendant advantages will appear from the following detailed description of the attached drawings whereof Fig. I is a view partly in elevation and partly in longitudinal section of the front end of a locomotive embodying my improved coupling means.

Fig. II is a fragmentary sectional view in plan taken as indicated by the arrows II—II in Fig. I.

Fig. III is a view like Fig. II, showing how the coupler is mounted for movement sidewise incident to rounding of curves by the locomotive.

Fig. IV is a broken-out transverse sectional view taken as indicated by the arrows IV—IV in Figs. I and II.

Fig. V is a detail view in longitudinal section taken as indicated by the arrows V—V Fig. II with portions broken out to illustrate important details of construction.

Figs. VI and VII are transverse detail sectional views taken as indicated respectively by the arrows VI—VI and VII—VII in Fig. I.

Designated comprehensively by the numeral 1 in the several drawings is a longitudinal medial hollow forwardly-projecting portion of the frame casting of the locomotive, to the front end of which is rigidly secured a hollow pilot casting 2, and to the sides of which, adjacent the front end, are rigidly secured flanking step support castings 3, 3. The forward cavity 4 in the frame projection 1 is substantially square in plan as shown in Fig. II with an upward extension as shown at 5 in Fig. I, and merges, through a somewhat laterally reduced offset 6 with the narrower rearward cavity 7 of said projection.

The coupling means with which the present invention is more especially concerned includes a coupler 8 with a claw head 9 of usual construction at the front end of its shank 10, which latter extends rearwardly through a central opening 11 in the front of the pilot 2, into the cavity 4 of the locomotive frame portion 1 where it is pivotally connected, by means of a transverse pin 12, to the forward clevised end of a horizontal yoke link member 13. As shown in Figs. I, II and V, the yoke link member 13 is in turn pivotally connected at its rear end, by means of a vertical pin 15, to the front end of the yoke member 16 of a draft gear 17 lodged in the narrow cavity 7 of the locomotive frame portion 1. The draft gear 17 may be of any standard type with means (not illustrated) enclosed in a box-like housing 18 within the opening of the yoke 16, influential upon a plunger 19, which, through a follower plate 20, reacts upon a pair of laterally spaced abutment pins 21 of rectangular cross section passed downwardly through the offset portion 6 of the locomotive frame 1 (Figs. I and II) to yieldingly restrain longitudinal movement of the yoke member 16 in a well known manner. In order to automatically seek its horizontal active position in which it is shown in full lines in the drawings, the coupler 8 is counterweighted at the rear end of its shank 10 by a hollow transversely-extending lead-filled head 22 which is upwardly recessed as at 23, 23 to clear the forwardly reaching arms of the coupler yoke link 13. As a result of the upward recessing of the weight head 22, there is formed a central lobe 25 which is rounded at the back as at 26 substantially concentrically with the axis of the pin 12 so that it may move into and out of the clevis opening of the coupler yoke link 13 and two flanking lobes 27, 27 which overhang said yoke link at opposite sides and which are joined with the central lobe by narrow connecting portions 28, 28 that normally rest on the tops of the arms of said yoke link as shown in dotted lines in Figs. I and VII and thus act as stops for the coupler 8.

From Fig. V, it will be noted that the curved rear surface 26 of the central counterweight lobe 25 of the coupler 8 normally bears against the crotch face 29 of the coupler yoke link 13, and that the opening in the shank 10 through which the pin 12 passes is elongated somewhat longitudinally with provision of a clearance at 31. As a consequence of this construction, the pin 12 is safeguarded against strain while the buffer load is directly communicated from the coupler 8, through the yoke 13 to the draft gear 17.

Interiorly of the cavity 4, the locomotive frame portion 1 is formed at opposite sides and near the bottom with laterally-spaced parallel inwardly-open horizontal guideways 32 which are faced at the bottom with hardened wear plates 33. Engaging the guideways 32 are shoe blocks 35 which are laterally recessed at their inner sides as at 36 to fit over the ends of a pin 37 which passes transversely through and is slidable endwise in bearings 38 within a crosswise tubular bar 39 connecting the clevis arms 13a of the coupler yoke link 13 at a level below the axis of the fulcrum pin 12. Due to this construction, the weight of the coupler yoke 13 and the coupler 8 is effectively sustained and the pin 15 whereby said yoke is connected with the draft gear yoke 16, is relieved of strain. As shown in Fig. III, the outer sides of the shoes 35 are curved to provide clearance between the shoes and the side walls of the guideways 32. As the coupler 8 is moved laterally in either direction about the pin 15, as shown in full and dot-and-dash lines in Fig. III, during rounding of curves in the track rails by the locomotive, the pin 37 slides endwise in the bearings 38. Such lateral movement of the coupler 8 is limited by contact thereof with the sides of the opening 11 in the pilot at 11a, 11a in Fig. III. The coupler 8 may be raised to compensate for wear by turning the shoes 35 one hundred and eighty degrees about the pin 37.

When in its normal raised or horizontal position, the coupler 8 is prevented from vibrating up and down and is in part supported by a retractable cross member in the form of a bar 40 which is engaged in openings 41 in the opposite sides of the pilot 2, see Figs. I, II and IV, the coupler being fitted at the bottom of its shank 10 with replaceable wear plates 42 adapted to contact directly with said bar. At one end the bar 40 is provided with a draw handle 43, and at the other end with a pivoted knuckle keeper 44 which normally prevents it from slipping accidentally out of place, but which, when turned into alignment with the bar as shown in dot-and-dash lines in Fig. II, permits said bar to be readily retracted endwise. When not needed, the coupler 8 may, upon withdrawal of the bar 40 sufficiently to clear the shank 10 of said coupler, be moved anti-clockwise in Fig. I about its pivotal connection 12 with the coupler yoke 13 and its head 9 depressed through the frontal opening 11 in the pilot 2 into the hollow of the latter. When fully depressed, the coupler head 9 is substantially wholly within the confines of the latter out of the way, and forms a substantially continuous surface with the front of the pilot 2 devoid of any projection or projections such as would retain impaled wreckage. Incident to turning the coupler 8 as just explained, the counterweighted end 22 is received in the upper part 5 of the cavity 4 in the locomotive frame 1 as also shown in dash-and-dot lines in Fig. I.

For the purpose of releasing the knuckle of the coupler 8, there is provided a means including a transverse shaft 45 (Figs. I and IV) which is journaled in forwardly-projecting bearing brackets 46 at the front of the locomotive frame above the coupler 8. The opposite ends of the shaft 45 are bent at an angle as at 47 in Fig. IV for service as manipulating handles, and at the center said shaft is formed with a crank offset 48 for connection of a yoke link 49 which overreaches the shank 10 of the coupler 8 when the latter is in normal position. The arms of this yoke link 49 are pivotally engaged at 50 with the arms of a second yoke link 51 which is in turn connected at 52, by a short straight link 53, with an eye 55 of the usual knuckle locking pin at the top of the coupler head 9. From Fig. I, it will be readily seen that turning the crank shaft 45 anti-clockwise in Fig. I through a right angle will result in lifting of the pin 55 to release the knuckle of the coupler 8 in a well known manner. From Figs. I and IV, it will be noted that the opening 11 in the front of the pilot 2 is proportioned and configured to permit the yoke links to pass freely into said pilot with the head 9 of the coupler 8 when the latter is depressed as previously explained. After depression of the coupler 8, the bar 40 is slid back into place to lock it against movement in its inactive out-of-the-way position.

Having thus described my invention, I claim:

1. Coupling means for locomotives and the like, comprising a counter-weighted coupler sustained in the locomotive frame structure; and a member pivoted to the draft gear for horizontal swinging movement, and to which the coupler is in turn pivotally connected for capacity to be depressed against its counterweight into a receiving opening therefor in the pilot of the locomotive.

2. Coupling means for locomotives and the like comprising a counterweighted coupler supported by reversely movable bearings in the front frame structure; a shock-absorbing draft gear with a yieldingly-restrained movable member, and a yoke whereto the coupler is pivotally connected with capacity for lateral swinging movement in service, and for being moved from active position to an inactive out-of-the-way position when not needed.

3. Coupling means for locomotives and the like, comprising a coupler; a shock-absorbing draft gear with a yieldingly-restrained movable member; a member to which the coupler is connected by horizontal pivot with capacity for movement of said coupler from a horizontal active position to a depressed position out of the way, and said member being in turn connected by a vertical pivot to the movable member of the draft gear to permit the coupler to move laterally in either direction when in active position as the locomotive rounds track curves.

4. Coupling means according to claim 3, including slidable means for supporting the second mentioned member from beneath to prevent strain on the vertical pivot by which it is connected to the first mentioned member, during lateral movement of the coupler.

5. Coupling means for locomotives and the like, comprising a coupler with a rearwardly-extending shank, a shock-absorbing draft gear with a yieldingly restrained movable member; a forwardly-extending horizontal yoke link whereof the rear end is connected by a vertical pivot to the movable member of the draft gear, and whereof a clevis at the front end receives and is connected by a horizontal pivot to the shank of the coupler, so that said coupler may move laterally in either direction about the vertical pivot as the locomotive rounds track curves, and be moved downwardly when not needed, about the horizontal pivot to an inactive position out of the way.

6. Coupling means according to claim 5, with means for supporting the link from beneath to prevent strain on the vertical pivot during lateral movements of the coupler, including a pair of fixed parallel guide ways, one at each side of the yoke link and open toward the latter, a transverse pin extending between said guideways, along which the link aforesaid is adapted for sliding movement, and shoe blocks in the guide ways having lateral recesses engaged by the ends of said transverse pin.

7. Coupling means for locomotives and the like comprising a coupler with a rearwardly-extending shank; a shock-absorbing draft gear having a yieldingly-restrained movable member; a horizontal yoke link connected at its rear end by a vertical pivot to the movable member of the draft gear, said link having a clevis at its forward end to receive the shank of a coupler and carrying a horizontal pin which passes transversely through the coupler shank so that said coupler may move laterally in either direction about vertical pivot incident to rounding of track curves by the locomotive, and moved downwardly when not needed about the horizontal pin to inactive position out of the way, the rear end of the coupler shank, when the coupler is in active position, bearing directly against the base of the clevised crotch of the link, and the coupler shank having a longitudinal slot through which the pin passes with provision of a clearance for the purpose of precluding imposition of buffing strains upon said pin.

8. Coupling means for locomotives and the like, comprising a counterweighted coupler; a shock-absorbing draft gear with a yieldingly-restrained movable member; a member pivoted for horizontal swinging movement to the movable member of the draft gear, whereto the coupler is in turn pivotally connected for capacity to be depressed against its counterweight into a receiving opening therefor in the pilot of the locomotive.

WARREN R. ELSEY.